United States Patent [19]

Walter et al.

[11] Patent Number: 4,837,400

[45] Date of Patent: Jun. 6, 1989

[54] POLYOXYMETHYLENE MOLDING MATERIALS HAVING IMPROVED THERMAL STABILITY, THEIR PREPARATION AND THEIR USE

[75] Inventors: Manfred Walter; Wilhelm Schuette, both of Speyer; Heiner Goerrissen, Ludwigshafen, all of Fed. Rep. of Germany

[73] Assignee: BASF Aktiengesellschaft, Ludwigshafen, Fed. Rep. of Germany

[21] Appl. No.: 152,389

[22] Filed: Feb. 4, 1988

Related U.S. Application Data

[63] Continuation-in-part of Ser. No. 077,217, Jul. 24, 1987, abandoned.

[30] Foreign Application Priority Data

Aug. 22, 1986 [DE] Fed. Rep. of Germany ....... 3628560

[51] Int. Cl.$^4$ .......................... C08K 5/52; C08K 5/13
[52] U.S. Cl. .................................. 524/145; 524/291; 524/342; 524/343; 524/456; 524/593
[58] Field of Search ............... 524/291, 342, 343, 145, 524/593, 456

[56] References Cited

U.S. PATENT DOCUMENTS

| | | | |
|---|---|---|---|
| 3,137,669 | 6/1964 | Bragaw | 524/593 |
| 3,658,749 | 4/1972 | Gordon | 524/593 |
| 3,743,614 | 7/1973 | Wolters et al. | 524/593 |
| 3,775,363 | 11/1973 | Braunstein et al. | 524/593 |
| 3,839,267 | 10/1974 | Golder | 524/456 |
| 4,342,680 | 8/1982 | Sugio et al. | 524/593 |
| 4,360,617 | 11/1982 | Müller et al. | 524/101 |
| 4,386,178 | 5/1983 | Schuette et al. | 524/100 |
| 4,506,053 | 3/1985 | Sakurai et al. | 524/593 |
| 4,517,319 | 5/1985 | Reske et al. | 523/216 |

FOREIGN PATENT DOCUMENTS

| | | |
|---|---|---|
| 0019761 | 12/1980 | European Pat. Off. . |
| 61-69868 | 4/1986 | Japan . |
| 0999422 | 7/1965 | United Kingdom . |
| 1133490 | 11/1968 | United Kingdom . |

*Primary Examiner*—Veronica P. Hoke
*Attorney, Agent, or Firm*—Keil & Weinkauf

[57] ABSTRACT

Polyoxymethylene molding materials having improved heat stability and consisting of
(A) one or more polyoxymethylene homopolymers and/or copolymers and
(B) one or more antioxidants having a sterically hindered phenolic structure,
(C) with or without additives, contain
(D) as an additive, one or more alkaline earth metal silicates and/or alkaline earth metal glycerophosphates, advantageously in an amount of from 0.002 to 2.0% by weight, based on the weight of component (A), for improving the heat stability, reducing the tendency to discoloration and minimizing the free formaldehyde content.

To prepare the novel polyoxymethylene molding materials, the components are advantageously melted in an extruder at from 150° to 260° C.

The polyoxymethylene molding materials are useful for the production of films or, preferably, moldings, which are used, for example, in the automotive, electrical appliances and electronics industries.

11 Claims, No Drawings

POLYOXYMETHYLENE MOLDING MATERIALS HAVING IMPROVED THERMAL STABILITY, THEIR PREPARATION AND THEIR USE

This is a continuation-in-part of application Ser. No. 077,217 filed July 24, 1987, now abandoned.

Polyoxymethylene homopolymers and/or copolymers have long been known. The polymers have a number of excellent properties and are therefore suitable for a wide variety of industrial applications. Nevertheless, there has been no lack of attempts to find agents for improving the processability, for example the flow, solidification time, etc., and/or for improving the mechanical properties and the dimensional stability of moldings produced from such polymers.

DE-A-1 208 490 (GB-A-999 422) discloses, for example, that oxymethylene polymers which contain metals, metal oxides, metal carbonates, metal silicates, metal sulfides, carbon, silica and/or boron and may contain glass fibers and asbestos fibers, can be used for the production of composites.

Mixtures of oxymethylene polymers and talc in an amount of from 0.0001 to 0.5% by weight, based on the weight of the oxymethylene polymer, are described in GB-A-11 33 490. The products have increased dimensional stability, but this is accompanied by a deterioration in the impact strength and possibly a change in the processability.

According to DE-A-23 19 359 (US-A-3 775 363), molding materials which consist of from 98 to 25% by weight of oxymethylene copolymers and from 2 to 75% by weight of acicular calcium metasilicate, the percentages being based on the total material, possess improved processability, dimensional stability and thermal ageing properties.

The prior art furthermore describes the stabilization of polyoxymethylene molding materials by means of suitable additives. For this purpose, antioxidants, eg. sterically hindered phenol derivatives, are added to the said molding materials. Phenol derivatives of this type are summarized in, for example, DE-A-27 02 661 (US-A-4 360 617). According to EP-A-19 761, alkoxymethylmelamines are incorporated into glass fiber-reinforced polyoxymethylene molding materials in order to improve the impact strength. According to EP-A-52 740 (US-A-4 386 178), polyoxymethylene molding materials which have been stabilized to heat at temperatures from 100° to 150° C. over a prolonged period are obtained by adding a partially etherified special melamine/formaldehyde condensate. DE-A-3 011 280 (US-A-4 342 680) describes stabilized oxymethylene copolymer materials which contain, as a stabilizer, a mixture of one or more amine-substituted triazines, one or more sterically hindered phenols and one or more metal-containing compounds. The metal-containing compounds in this case are preferably potassium, calcium or magnesium hydroxide or magnesium carbonate.

In spite of these measures, known polyoxymethylene molding materials possess heat stability which is insufficient for some applications, adversely affects the processing to moldings and, for example, contributes to deposits on the mold or to deterioration of the demolding properties and/or leads to discoloration and a deterioration in the mechanical properties during subsequent use. Another disadvantage is that the mixtures may still contain formaldehyde adducts which may result in formaldehyde elimination and hence in odor nuisance during processing at elevated temperatures.

It is an object of the present invention to improve the heat stability of polyoxymethylene molding materials and to reduce the tendency to discoloration, and at the same time to minimize any residual formaldehyde content.

We have found that this object is achieved, surprisingly, by the addition of specially selected additives.

The present invention therefore relates to polyoxymethylene molding materials consisting of (A) one or more polyoxymethylene homopolymers and/or copolymers and (B) one or more antioxidants having a sterically hindered phenolic structure, (C) with or without additives, which molding materials contain, (D) as additives for improving the heat stability, one or more alkaline earth metal silicates or one or more alkaline earth metal glycerophosphates or a mixture of two or more of the stated compounds. The alkaline earth metal glycerophosphates having the chemical formula $C_3H_7O_6PMe$, wherein Me is an alkaline earth metal, preferably calcium or magnesium.

The present invention furthermore relates to a process for the preparation of polyoxymethylene molding materials and to the use of the said molding materials for the production of films and, preferably, moldings.

In order to achieve very good heat stability in conjunction with little tendency to discoloration and a minimum formaldehyde content, the polyoxymethylene molding materials advantageously contain from 0.002 to 2.0, preferably from 0.005 to 0.5, in particular from 0.01 to 0.3, % by weight, based on the weight of component (A), of one or more of the alkaline earth metal silicates and/or alkaline earth metal glycerophosphates. Calcium and in particular magnesium have been found to be preferable as alkaline earth metals for forming the silicates and glycerophosphates. Advantageously, calcium glycerophosphate and, preferably, magnesium glycerophosphate and/or calcium silicate and, preferably, magnesium silicate are used, particularly preferred alkaline earth metal silicates being those of the formula $$MeO \cdot xSiO_2 \cdot nH_2O$$

where Me is an alkaline earth metal, preferably calcium or, in particular, magnesium, x is from 1.4 to 10, preferably from 1.4 to 6 and n is greater than or equal to 0, preferably from 0 to 8.

The additives (D) are advantageously used in finely milled form. Products having a mean particle size of less than 100 μm, preferably less than 50 μm, are particularly suitable.

Calcium and magnesium silicates and/or calcium and magnesium glycerophosphates, which are preferably used, can be defined, for example, by the following characteristic data:

Calcium and magnesium silicate:
Content of CaO or MgO: from 4 to 32, preferably from 8 to 30, in particular from 12 to 25, % by weight,
$SiO_2$:CaO or $SiO_2$:MgO ratio (mole/mole): from 1.4 to 10, preferably from 1.4 to 6, in particular from 1.5 to 4, Bulk density: from 10 to 80, preferably from 10 to 40, g/100 ml and
Mean particle size: less than 100 μm, preferably less than 50 μm Calcium and magnesium glycerophosphates:

Content of calcium glycerophosphate or magnesium glycerophosphate: greater than 70, preferably greater than 80, by weight, Residue on ignition: from 45 to 65% by weight, Melting point: higher than 300° C. and Mean particle size: less than 100 μm, preferably less than 50 μm.

Regarding the components (A) and (B) and, where relevant, (C) which can be used for the novel polyoxymethylene molding materials, the following may be stated:

(A) Suitable polyoxymethylenes (A) for the purposes of the present invention are homopolymers of formaldehyde and copolymers of formaldehyde and of trioxane with cyclic and/or linear formals, such as butanediol formal, or epoxides, such as ethylene oxide or propylene oxide. As a rule, the homopolymers have thermally stable terminal groups, such as ester or ether groups. The copolymers of formaldehyde or of trioxane advantageously contain more than 50%, in particular more than 75%, of oxymethylene groups. Copolymers which have proven particularly useful are those which contain not less than 0.1% of groups of the comonomer which have two or more adjacent carbon atoms in the chain. Polyoxymethylenes which have become particularly important industrially are those which contain from 1 to 10% by weight of comonomers. Such copolymers are obtainable in a conventional manner by cationic copolymerization of trioxane with suitable comonomers, such as cyclic ethers or acetals, eg. ethylene oxide, 1,3-dioxolane, 1,3-dioxane or 1,3-dioxacycloheptane, or with linear oligoformals or polyformals, such as polydioxolane or polybutanediol formal. As a rule, the polyoxymethylenes used have a number average molecular weight $M_n$ of from 2,000 to 100,000, preferably from 10,000 to 100,000 and an MFI of from 0.5 to 200, preferably from 1 to 50, at 190° C. and 21.17N, according to DIN 53,735. Polymers which are composed of trioxane and from 1 to 10 mol% of ethylene oxide, 1,3-dioxolane or butanediol formal have become particularly important. As stated above, the novel molding materials advantageously contain from 40 to 95% by weight, based on the weight of components (A) and (B), of one or more polyoxymethylenes.

If required, further compounds containing a plurality of polymerizable groups in the molecule, eg. alkylglycidyl formals, polyglycol diglycidyl ethers, alkanediol diglycidyl ethers or bis-(alkanetriol) triformals, are used as additional comonomers, in an amount of from 0.05 to 5, preferably from 0.1 to 2, % by weight, based on the total amount of monomers.

(B) Advantageous antioxidants (B) which have a sterically hindered phenolic structure and are advantageously used in combination with heat costabilizers are compounds of the formula

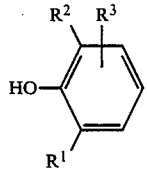

where $R^1$ and $R^2$ may be identical or different and are each unsubstituted or substituted alkyl or a substituted triazole group and $R^3$ is unsubstituted or substituted alkyl, alkoxy or substituted amino. Antioxidants of the stated type are described in, for example, DE-A-27 02 661 (US-A-4 360 617).

Specific examples are 2,2'-methylene-bis-(4-methyl-6-tert-butylphenol), 1,6-hexanediol bis-[3-(3,5-di-tert-butyl-4-hydroxyphenyl)-propionate], pentaerythrityl tetrakis-[3-(3,5-di-tert-butyl-4-hydroxyphenyl)-propionate], distearyl 3,5-di-tert-butyl-4-hydroxybenzyl phosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3-5-distearylthiotriazylamine, 2-(2'-hydroxy-3',5'-di-tert-butylphenyl)-5-chlorobenzotriazole, 2,6-di-tert-butyl-4-hydroxymethylphenol, 1,3,5-trimethyl-2,4,6-tris-(3,5-di-tert-butyl-4-hydroxybenzyl)-benzene, 4,4'-methylene-bis-(2,6-di-tert-butylphenol), 3,5-di-tert-butyl-4-hydroxybenzyldimethylamine and N,N'-hexamethylenebis-3,5-di-tert-butyl-4-hydroxydrocinnamide. 2,2'-methylene-bis-(4-methyl-6-tert-butylphenol), 1,6-hexanediol bis-[3-(3,5-di-tert-butyl-4-hydroxyphenyl)-propionate] and pentaerythrityl tetrakis-[3-(3,5-di-tert-butyl-4-hydroxyphenyl)-propionate] have proven particularly effective and are therefore preferably used.

The antioxidants (B), which can be used individually or as a mixture, are advantageously employed in an amount from 0.05 to 2, preferably from 0.1 to 1.0, % by weight, based on the weight of component (A).

(C) In addition to the components (A), (B) and (D) which are essential for the invention, the novel polyoxymethylene molding materials can, if required, contain additives (C).

Examples of suitable additives (C) which may or may not be present are stabilizers, reinforcing fillers, nucleating agents, antistatics, light stabilizers, flame-proofing agents, slip agents and lubricants, plasticizers, pigments, dyes, optical brighteners, internal lubricants and the like.

Particularly suitable stabilizers, preferably heat costabilizers, are nylons, amides of polybasic carboxylic acids, amidines, eg. dicyanodiamide, hydrazines, ureas, poly-(N-vinyllactams) and alkaline earth metal salts of aliphatic, preferably hydroxyl-containing, monobasic to tribasic carboxylic acids of 2 to 20 carbon atoms, eg. calcium stearate, calcium ricinoleate, calcium lactate and calcoum citrate. Examples of suitable light stabilizers are α-hydroxybenzophenone derivatives and benzotriazole derivatives. The stabilizers are generally used in a total amount of from 0.1 to 5, preferably from 0.5 to 3, % by weight, based on the weight of component (A).

To prepare the novel polyoxymethylene molding materials having improved heat stability, the components (A), (B) and (D) and, if required, (C), individually or in the form of one or more prepared mixtures, can be fed into a suitable mixing apparatus and mixed therein, advantageously at elevated temperatures, for example from 150° to 260° C. In the most advantageous and therefore preferably used preparation process, the polyoxymethylene homopolymer and/or copolymer (A), which can be used in particular in the form of a crude material contaminated with minor amounts of trioxane and/or other unstable adducts, the mixture of the antioxidants (B), the additives (D) and, where relevant, the additives (C) are mixed thoroughly at from 0° to 150° C., preferably from 0° to 50° C. The mixture is introduced into an extruder, preferably a twin-screw extruder, which may be equipped with a devolatilization apparatus, and melted at from 150° to 260° C., preferably from 200° to 250° C., the melt is devolatilized and extruded and the extrudates are cooled and granulated.

The granules obtained can be stored temporarily or used directly for the production of films or, preferably, moldings.

The novel polyoxymethylene molding materials possess not only good mechanical properties but also substantially improved heat stability and a smaller tendency to discoloration as well as a lower residual formaldehyde content, and are useful for the production of, for example, films or preferably moldings by a conventional method, for example by blow molding, extrusion or injection molding. The moldings are used, for example, in the automotive, electrical appliances and electronics industries.

EXAMPLES 1 TO 8 AND COMPARATIVE EXAMPLES A TO J 99.7 parts by weight of a crude polyoxymethylene copolymer prepared from a mixture of 97.3% by weight of trioxane and 2.7% by weight of butanediol formal, having an MFI of 9 g/10 min at 190° C. and 21.17N (DIN 53,735) and still containing about 3% by weight of unconverted trioxane and about 5% by weight of a thermally stable adduct were mixed with 0.3 parts by weight of 1,6-hexanediol bis-3-(3,5-di-tert-butyl-4-hydroxyphenyl)-propionate and, where relevant, with from 0.2 to 0.1% by weight of additive (D) or from 0.1 to 0.5% by weight of the comparative substance, the percentages being based on the weight of the crude polyoxymethylene copolymer, in a dry blender at 23° C. The mixture was introduced, at 23° C., into a twin-screw extruder having a devolatilization apparatus (type ZSK 28 from Werner and Pfleiderer, Stuttgart), homogenized at 230° C. and devolatilized, the homogenized mixture was extruded through a die and the extrudates were granulated.

To test the heat stability and tendency to discoloration, the following were determined:

$WL_{N2}$: The weight loss, in percent, of a sample of 2 g of granules on heating for 2 hours and 8 hours at 220° C. under nitrogen.

$WL_{air}$: Weight loss, in percent, of a sample of 1 g of granules on heating for 2 hours and 8 hours at 220° C. under air.

Color: Color of the material reweighed after the 8-hour $WL_{N2}$ test.

The additives (D) used and the comparative substances, which are specified in detail below, the amounts of these and the results obtained are summarized in Tables 1 and 2.

Additives (D) used according to the invention

Calcium silicate

Content of CaO: from 14 to 18% by weight
Content of SiO$_2$: from 60 to 68% by weight
Bulk density: 15 g/100 ml
Loss on ignition: from 15 to 30% by weight
Mean particle size: <50 μm

Magnesium trisilicate

Content of MgO: >20% by weight
Content of SiO$_2$: <45% by weight
SiO$_2$:MgO ratio=1.5 mole/mole
Bulk density: from 25 to 40 g/100 ml
Mean particle size: from 20 to 40 μm
Loss on ignition: from 20 to 30% by weight Synthetic Mg silicate (Ambosol® from Societé Nobel Bozel, Puteaux, France)

Content of MgO: $\geq$14.8% by weight
Content of SiO$_2$: $\geq$59% by weight
SiO$_2$:MgO ration=2.7 mole/mole
Bulk density: from 20 to 30 g/100 ml
Loss on ignition: <25% by weight

Calcium glycerophosphate

Content of calcium glycerophosphate: <84% by weight
Residue on ignition: from 51 to 57% by weight
Free acid: <0.2 mmol/g
Free base: <0.2 mmol/g

Magnesium glycerophosphate

Content of magnesium glycerophosphate: <82% by weight
Residue on ignition: from 47 to 52% by weight
Free acid: <0.2 mmol/g
Free base: >0.2 mmol/g Heat stabilizers used as comparative substances

Silica gel

Pore volume: about 1 cm$^3$/g
Loss on ignition: from 5 to 8% by weight
Mean particle size: about 5 μm

Aluminum magnesium silicate

Content of MgO: about 9% by weight
Content of Al$_2$O$_3$: about 6% by weight
Content of SiO$_2$: about 56% by weight
Bulk density: about 16 g/100 ml
Loss on ignition: <25% by weight

Nylon

Nylon oligomer having a molecular weight of about 3,000, prepared from caprolactam, hexamethylenediamine, adipic acid and acetic acid by a method similar to that described in US-A-3 960 984, Example 5-4.

Talc (3MgO.4SiO$_2$.nH$_2$O): Particle size: less than 20 μm.

Melamine/formaldehyde condensate: Prepared as described in DE-A-25 40 207, Example 1.

Calcium stearate: Particle size: less than 10 μm

Calcium 12-hydroxystearate: Particle size: less than 10 μm.

TABLE 1

| | Additive D | | $WL_{N2}$ | | $WL_{air}$ | | |
| Example | Type | Amount [% by wt.] | 2 hours [% by wt.] | 8 hours [% by wt.] | 2 hours [% by wt.] | 8 hours [% by wt.] | Color |
| --- | --- | --- | --- | --- | --- | --- | --- |
| 1 | calcium silicate | 0.1 | 0.32 | 0.83 | 2.10 | 16.40 | white |
| 2 | magnesium silicate | 0.1 | 0.19 | 0.67 | 1.52 | 13.70 | white |
| 3 | synth. magnesium silicate | 0.1 | 0.04 | 0.51 | 1.06 | 9.57 | white |
| 4 | synth. magnesium silicate | 0.02 | 0.07 | 0.61 | 1.31 | 10.07 | white |
| 5 | calcium glycerophosphate | 0.1 | 0.20 | 0.87 | 2.07 | 16.30 | white |
| 6 | magnesium glycerophosphate | 0.1 | 0.13 | 0.62 | 1.49 | 13.02 | white |
| 7 | magnesium glycerophosphate | 0.05 | 0.19 | 0.60 | 1.31 | 12.91 | white |

TABLE 1-continued

| Example | Additive D Type | Amount [% by wt.] | WL$_{N_2}$ 2 hours [% by wt.] | WL$_{N_2}$ 8 hours [% by wt.] | WL$_{air}$ 2 hours [% by wt.] | WL$_{air}$ 8 hours [% by wt.] | Color |
|---|---|---|---|---|---|---|---|
| 8 | magnesium glycerophosphate | 0.02 | 0.04 | 0.51 | 1.68 | 14.12 | white |

TABLE 2

| Comparative Example | Comparative substance Type | Amount [% by wt.] | WL$_{N_2}$ 2 hours [% by wt.] | WL$_{N_2}$ 8 hours [% by wt.] | WL$_{air}$ 2 hours [% by wt.] | WL$_{air}$ 8 hours [% by wt.] | Color |
|---|---|---|---|---|---|---|---|
| A | — | — | 0.64 | 4.52 | 4.39 | 20.71 | white |
| B | silica gel | 0.1 | 2.16 | 10.66 | 4.48 | 27.11 | white |
| C | aluminum magnesium silicate | 0.1 | 3.01 | 7.87 | 12.17 | 31.40 | white |
| D | nylon | 0.1 | 0.28 | 0.84 | 2.38 | 17.70 | beige |
| E | nylon | 0.5 | 0.21 | 0.71 | 2.19 | 15.97 | beige |
| F | calcium stearate | 0.1 | 0.17 | 0.66 | 1.91 | 16.95 | beige |
| G | calcium 12-hydroxy-stearate | 0.1 | 0.12 | 0.54 | 1.80 | 18.18 | yellow |
| H | calcium 12-hydroxy-stearate | 0.4 | 0.10 | 0.74 | 1.45 | 17.76 | yellow |
| I | talc | 0.1 | 0.60 | 2.16 | 6.97 | 22.50 | beige |
| J | melamine/formaldehyde condensate | 0.5 | 0.44 | 3.21 | 2.47 | 17.35 | beige |

We claim:

1. A polyoxymethylene molding material having improved heat stability comprising
   (A) one or more polyoxymethylene homopolymers and/or copolymers,
   (B) one or more antioxidants having a sterically hindered phenolic structure, and
   (C) one or more alkaline earth metal glycerophosphates of the chemical formula C$_3$H$_7$O$_6$PMe and/or alkaline earth metal silicates of the chemical formula MeO.xSiO$_2$.nH$_2$O where Me is an alkaline earth metal, x is from 1.4 to 10 and n is greater than or equal to 0, for improving the heat stability.

2. The polyoxymethylene molding material of claim 1 which contains the component (C) in an amount of from 0.002 to 2% by weight, based on the weight of component (A).

3. The polyoxymethylene molding material of claim 1 wherein the silicates contain calcium as the alkaline earth metal.

4. The polyoxymethylene molding material of claim 1 wherein the silicates contain magnesium as the alkaline earth metal.

5. The polyoxymethylene molding material of claim 1 wherein the glycerophosphates contain calcium as the alkaline earth metal.

6. The polyoxymethylene molding material of claim 1 wherein the glycerophosphates contain magnesium as the alkaline earth metal.

7. The polyoxymethylene molding material of claim 1 which contains one or more antioxidants having a sterically hindered phenolic structure (B) in an amount of from 0.05 to 2% by weight, based on the weight of component (A).

8. A polyoxymethylene molding material having improved heat stability comprising
   (A) one or more polyoxymethylene homopolymers and/or copolymers,
   (B) one or more antioxidants having a sterically hindered phenolic structure, and
   (C) one or more alkaline earth metal glycerophosphates of the formula C$_3$H$_7$O$_6$PMe for improving heat stability wherein Me is calcium or magnesium.

9. A process for the preparation of a polyoxymethylene molding material having improved heat stability comprising
   (A) one or more polyoxymethylene homopolymers and/or copolymers,
   (B) one or more antioxidants having a sterically hindered phenolic structure, and
   (C) an additive for improving the heat stability, wherein one or more alkaline earth metal glycerophosphates of the chemical formula C$_3$H$_7$O$_6$PMe and/or alkaline earth metal silicates of the chemical formula MeO.xSiO$_2$.nH$_2$O where Me is an alkaline earth metal, x is from 1.4 to 10 and n is greater than or equal to 0, comprising melting components (A), (B) and (C) in an extruder at from 150 to 260 C, extruding the melt and granulating the extrudates.

10. The process of claim 9 wherein components (A), (B) and (C) are melted in an extruder at from 150° to 260° C., the melt is extruded and the extrudates are then granulated.

11. The process of claim 9 wherein the glycerophosphates and silicates contain calcium or magnesium as the alkaline earth metal.

* * * * *